UNITED STATES PATENT OFFICE.

JÜRGEN CALLSEN, OF ELBERFELD, GERMANY, ASSIGNOR TO SYNTHETIC PATENTS CO., INC., OF NEW YORK, N. Y., A CORPORATION OF NEW YORK.

DIETHYLACETYLISOCYANATE.

1,098,938.     Specification of Letters Patent.     Patented June 2, 1914.

No Drawing.     Application filed December 12, 1913. Serial No. 806,214

*To all whom it may concern:*

Be it known that I, JÜRGEN CALLSEN, doctor of philosophy, chemist, citizen of the German Empire, residing at Elberfeld, Germany, have invented new and useful Improvements in Diethylacetylisocyanate, of which the following is a specification.

My invention relates to the manufacture and production of the hitherto unknown diethylacetylisocyanate:

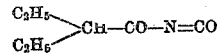

being a technically valuable compound. It can be obtained by treating diethylacetyl bromid or chlorid with a silver or mercury salt of isocyanic acid.

The new product is a limpid oil boiling at 67–72° C. under a pressure of 50 mm. It is soluble in petrolether, ligroin and benzene and yields diethylacetylcarbamid with ammonia.

In order to illustrate the new process more fully the following example is given, the parts being by weight:—160 parts of potassium cyanate dissolved in 2000 parts of water are added to a solution of 520 parts of mercuro nitrate in small quantity of water while the liquid is stirred. The salt precipitated is filtered off, washed with water and dried. Subsequently 120 parts of this salt are heated in a vessel provided with a cooler and a stirrer with 500 parts of petrolether and 66 parts of diethylacetylchlorid. The mixture is filtered, the petrolether distilled off and the residue is distilled *in vacuo*.

I claim:—

As a new article of manufacture the diethylacetylisocyanate having most probably the formula:

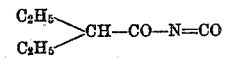

which is a limpid oil boiling at from 67–72° C. under a pressure of 50 mm.; soluble in petrolether, ligroin and benzene; and yielding diethylacetylcarbamid with ammonia, substantially as described.

In testimony whereof I have hereunto set my hand in the presence of two subscribing witnesses

JÜRGEN CALLSEN. [L. S.]

Witnesses:
ALBERT NUFER,
PAUL KAUFMANN.